(12) United States Patent
Kang et al.

(10) Patent No.: US 9,809,229 B2
(45) Date of Patent: Nov. 7, 2017

(54) VEHICLE AND METHOD OF CONTROLLING THE SAME

(71) Applicant: HYUNDAI MOTOR COMPANY, Seoul (KR)

(72) Inventors: Kyunghyun Kang, Suwon-Si (KR); Ki Dong Kang, Seoul (KR); HeeJin Ro, Seoul (KR); Seok-young Youn, Seoul (KR); Sung Un Kim, Yongin-Si (KR); Bitna Baek, Seoul (KR); Ga Hee Kim, Suwon-Si (KR); Jong Hyuck Heo, Yongin-Si (KR); Chisung Kim, Seoul (KR)

(73) Assignee: HYUNDAI MOTOR COMPANY, Seoul (KR)

(*) Notice: Subject to any disclaimer, the term of this patent is extended or adjusted under 35 U.S.C. 154(b) by 21 days.

(21) Appl. No.: 14/958,391

(22) Filed: Dec. 3, 2015

(65) Prior Publication Data

US 2016/0272216 A1 Sep. 22, 2016

(30) Foreign Application Priority Data

Mar. 19, 2015 (KR) ........................ 10-2015-0038356

(51) Int. Cl.
*G06F 7/00* (2006.01)
*B60W 40/09* (2012.01)
*B60W 50/08* (2012.01)
*B60W 50/14* (2012.01)
*B60W 30/16* (2012.01)

(52) U.S. Cl.
CPC ............ *B60W 40/09* (2013.01); *B60W 30/16* (2013.01); *B60W 50/087* (2013.01); *B60W 50/14* (2013.01); *B60W 2520/10* (2013.01); *B60W 2540/10* (2013.01); *B60W 2540/12* (2013.01); *B60W 2540/18* (2013.01); *B60W 2750/40* (2013.01)

(58) Field of Classification Search
CPC .... B60W 40/09; B60W 30/16; B60W 50/087; B60W 50/14; B60W 2520/10; B60W 2540/10; B60W 2540/12; B60W 2540/18; B60W 2750/40
USPC .......................................................... 701/36
See application file for complete search history.

(56) References Cited

U.S. PATENT DOCUMENTS

| 2007/0080816 A1* | 4/2007 | Haque .................. B60K 28/066 340/576 |
| 2015/0158495 A1* | 6/2015 | Duncan ................. B60W 40/09 701/1 |
| 2016/0009284 A1* | 1/2016 | Tokimasa ................ G01S 13/08 701/96 |

FOREIGN PATENT DOCUMENTS

| JP | 2007-293625 A | 11/2007 |
| JP | 2008-084005 A | 4/2008 |
| KR | 10-1996-0025264 A | 7/1996 |
| KR | 1996-034676 Y1 | 11/1996 |

(Continued)

*Primary Examiner* — Calvin Cheung
*Assistant Examiner* — Paula L Schneider
(74) *Attorney, Agent, or Firm* — McDermott Will & Emery LLP

(57) ABSTRACT

A vehicle includes a sensor configured to obtain driving information of a driver; a controller configured to confirm a driving pattern of the driver based on the obtained driving information, and generate an output signal which outputs a recommended driving method corresponding to the confirmed driving pattern; and a communicator configured to directly transmit the generated output signal to adjacent vehicles.

22 Claims, 13 Drawing Sheets

(56) References Cited

FOREIGN PATENT DOCUMENTS

| | | |
|---|---|---|
| KR | 10-2002-0052308 A | 7/2002 |
| KR | 10-0781135 B1 | 11/2007 |
| KR | 10-1077893 B1 | 10/2011 |
| KR | 10-2014-0030687 A | 3/2014 |

* cited by examiner

VEHICLE AND METHOD OF CONTROLLING THE SAME

CROSS-REFERENCE TO RELATED APPLICATION

This application claims the benefit of priority to Korean Patent Application No. 10-2015-0038356, filed on Mar. 19, 2015 in the Korean Intellectual Property Office, the disclosure of which is incorporated herein by reference.

TECHNICAL FIELD

Embodiments of the present invention relate to a vehicle capable of directly communicating with an adjacent vehicle and a method of controlling the same.

BACKGROUND

Recently, in order to achieve commercialization of 5th Generation (5G) mobile communication by the year 2020, investment in R&D has been competitively accelerated in many countries. Various research into broadband frequency technology, heterogeneous network technology, multi-beam based technology, device-to-device (D2D) communication technology, and so on is being conducted to achieve the goal of commercialization of 5G technology.

Since D2D communication technology is a direct communication technology between devices without going through networks, thus controlling data traffic increases, terminals can communicate without any influence on network traffic, and thus an effect that overall expansion of cell capacity can be expected.

When the D2D communication technology is applied to vehicles, mass data communication between the vehicles can be performed in real time, thereby a driver can drive the vehicle in a safer and more comfortable environment.

SUMMARY

Therefore, one aspect of the present invention provides a vehicle which transmits an output signal, which functions to outputs a recommended driving method corresponding to a driving pattern of a driver, to an adjacent vehicle and a method of controlling the same.

Additional aspects of the invention will be set forth in part in the description which follows and, in part, will be obvious from the description, or may be learned by practice of the invention.

In accordance with one aspect of the present invention, a vehicle includes a sensor configured to obtain driving information of a driver, a controller configured to confirm a driving pattern of the driver based on the obtained driving information, and generate an output signal which outputs a recommended driving method corresponding to the confirmed driving pattern, and a communicator configured to directly transmit the generated output signal to adjacent vehicles.

The sensor may obtain the driving information including at least one of an intensity of acceleration of the driver, a braking strength, a steering angle, and a speed of the vehicle.

The controller may generate the output signal which outputs the recommended driving method for an adjacent vehicle positioned corresponding to the driving pattern.

The communicator may directly transmit the output signal to the adjacent vehicle positioned corresponding to the driving pattern.

When the obtained driving information satisfies a preset condition, the controller may determine the driving pattern corresponding to the condition.

The communicator may communicate with a server, and the controller may transmit the obtained driving information to the server through the communicator, and receive the driving pattern of the driver from the server through the communicator.

The controller may generate a first output signal which outputs the recommended driving method for a rear vehicle among the adjacent vehicles when the driving pattern of the driver is confirmed as a rapid braking pattern, and the communicator may directly transmit the first output signal to the rear vehicle.

The controller may generate the first output signal which outputs the recommended driving method including at least one of a securement of a safe distance from a front vehicle, a deceleration of driving, and a change in a set value of distance from the front vehicle of an Advanced Smart Cruise Control (ASCC).

The controller may generate a second output signal which outputs the recommended driving method for the directly adjacent vehicle among the adjacent vehicles when the driving pattern of the driver is confirmed as a one-side lane departure pattern, and the communicator may directly transmit the second output signal to the directly adjacent vehicle.

The controller may generate the second output signal which outputs the recommended driving method including a securement of a safe distance from the vehicle.

The vehicle may further include an output device configured to output the recommended driving method in response to the received output signal when the communicator receives the output signal from the adjacent vehicle.

In accordance with another aspect of the present invention, a method of controlling a vehicle includes obtaining driving information on a driver, confirming a driving pattern of the driver based on the obtained driving information, generating an output signal which outputs a recommended driving method corresponding to the confirmed driving pattern, and directly transmitting the generated output signal to adjacent vehicles.

The obtaining of the driving information on the driver may include obtaining the driving information including at least one of an intensity of acceleration of the driver, a braking strength, a steering angle, and a speed of the vehicle.

The generating of the output signal may include generating the output signal which outputs the recommended driving method for the adjacent vehicle positioned corresponding to the driving pattern.

The directly transmitting of the output signal to the adjacent vehicles may include directly transmitting the output signal to the adjacent vehicle positioned corresponding to the driving pattern.

The confirming of the driving pattern of the driver based on the obtained driving information may include determining whether the obtained driving information satisfies a preset condition, and determining the driving pattern corresponding to the condition when the condition is satisfied.

The confirming of the driving pattern of the driver based on the obtained driving information may include transmitting the obtained driving information to a server, and receiving the driving pattern of the driver from the server.

The generating of the output signal may include generating a first output signal which outputs the recommended driving method for the rear vehicle among the adjacent vehicles when the driving pattern of the driver is confirmed as a rapid braking pattern, and the directly transmitting of the generated output signal to the adjacent vehicles may directly transmit the first output signal to the rear vehicle.

The generating of the first output signal may generate the first output signal which outputs the recommended driving method including at least one of a securement of a safe distance from a front vehicle, a deceleration of driving, and a change in a distance setting value from the front vehicle of an ASCC.

The generating of the output signal may include generating a second output signal which outputs the recommended driving method for the directly adjacent vehicle among the adjacent vehicles when the driving pattern of the driver is confirmed as a one-side lane departure pattern, and the directly transmitting of the output signal to the directly adjacent vehicle may include directly transmitting the second output signal to the directly adjacent vehicle.

The generating of the second output signal may include generating the second output signal which outputs the recommended driving method including a securement of a safe distance from the vehicle.

The method may further include receiving the output signal from the adjacent vehicle, and outputting the recommended driving method in response to the received output signal.

BRIEF DESCRIPTION OF THE DRAWINGS

These and/or other aspects of the invention will become apparent and more readily appreciated from the following description of the embodiments, taken in conjunction with the accompanying drawings, in which.

DETAILED DESCRIPTION

Figure 1:
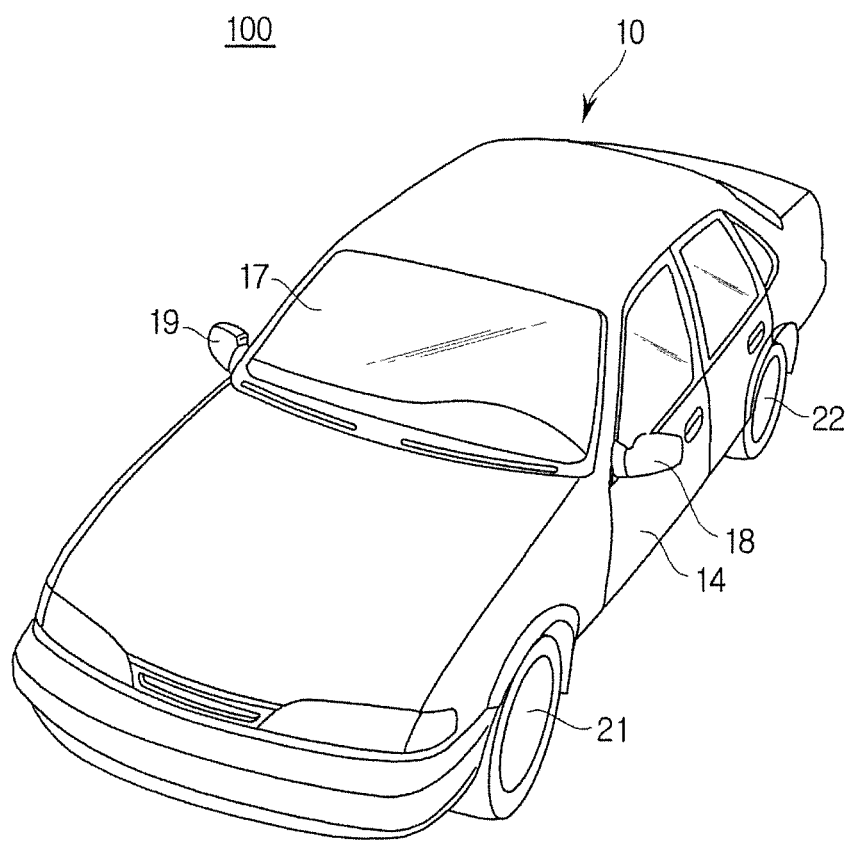
FIG. 1 is a view illustrating an exterior of a vehicle according to one embodiment.

Reference will now be made in detail to the embodiments of the present invention, examples of which are illustrated in the accompanying drawings, wherein like reference numerals refer to like elements throughout.

Hereinafter, a vehicle and a method of controlling the same will be described with reference to the accompanying drawings in detail.

FIG. 1 is a view illustrating an exterior of a vehicle according to one embodiment.

As shown in FIG. 1, the vehicle according to one embodiment includes a body 10 which forms the exterior of a vehicle 100, wheels 21 and 22 which move the vehicle 100, doors 14 which shield the inside of the vehicle 100 from the outside, a front glass 17 which provides a view ahead of the vehicle 100 to a driver inside the vehicle 100, and side mirrors 18 and 19 which provide a view in a rearward direction of the vehicle 100 to the driver.

The wheels 21 and 22 include a front wheel 21 provided in the front of the vehicle 100, and a rear wheel 22 provided in the rear of the vehicle 100. The front wheel 21 or the rear wheel 22 receives rotatory power from a driving device to be described below, and the body 10 may be moved in a forward or rearward direction.

The doors 14 are provided to be rotatable on left and right sides of the body 10. When the door 14 is open, a driver may enter into the vehicle 100, and when the door 14 is closed, the inside of the vehicle 100 is shielded from the outside.

The front glass 17 is provided on a forward top side of the body 10 so that the driver inside the vehicle 100 may obtain visual information in front of the vehicle 100, and the front glass 17 is also referred to as a windshield glass.

Further, the side mirrors 18 and 19 include a left side mirror 18 provided on a left side of the body 10 and a right side mirror 19 provided on a right side thereof so that the driver inside the vehicle 100 may obtain visual information in lateral and rearward directions of the vehicle 100.

Figure 2:
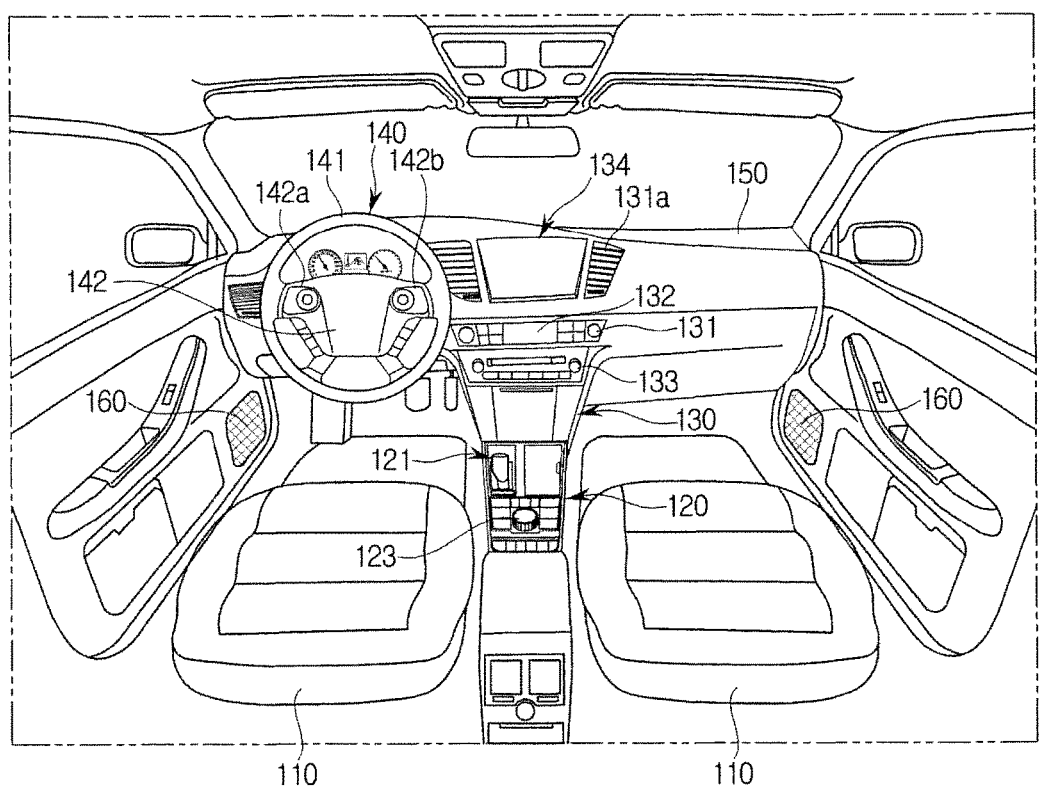
FIG. 2 is a view illustrating an internal configuration of a vehicle according to one embodiment.

FIG. 2 is a view illustrating an internal configuration of a vehicle according to one embodiment.

As shown in FIG. 2, the vehicle 100 may include seats 110 on which a driver and/or the like may sit, a gear box 120, a dashboard 150 provided with a center fascia 130, a steering wheel 140, etc., and a speaker 160.

A gearshift 121 for changing the gear of the vehicle 100, and a dial manipulator 123 for controlling operations of functions of the vehicle 100 may be installed in the gear box 120.

As the steering wheel 140 provided in the dashboard 150 is a device for controlling a driving direction of the vehicle 100, the steering wheel 140 is connected to a rim 141 to be gripped by the driver and a steering device of the vehicle 100 to be described below, and may include a spoke 142 which connects a hub of a rotational shaft for steering and the rim 141. In some embodiments, operating devices 142a and 142b may be formed in the spoke 142 to control various types of devices, e.g., audio device, etc., included in the vehicle 100.

An air conditioning device 131, a clock 132, an audio device 133, a display, and/or the like may be installed in the center fascia 130 provided in the dashboard 150.

The air conditioning device 131 controls a temperature, humidity, air quality, and an air flow inside the vehicle 100 and maintains a pleasant interior of the vehicle 100. The air conditioning device 131 is installed in the center fascia 130 and may include at least one outlet 131a which discharges air. Buttons, dials, and/or the like may be installed in the center fascia 130 to control the air conditioning device 131, etc. Passengers, such as a driver, etc., may control the air conditioning device 131 using the buttons disposed in the center fascia 130.

The clock 132 may be provided in the vicinity of the buttons or dials for controlling the air conditioning device 131.

The audio device 133 may include an operating panel provided with a plurality of buttons for performing functions of the audio device 133. The audio device 133 may provide a radio mode which provides a function of a radio and a media mode which replays audio files included in various storage media having audio files.

The display 134 may display information on the vehicle 100 in an image or text form. For example, when an output signal which outputs a recommended driving method of the vehicle 100 is received, the display 134 may inform a passenger of the recommended driving method corresponding to the output signal through outputting in an image or text.

To this end, the display 134 may be formed to be embedded in the center fascia 130. However, the example of the installation of the display is not limited thereto, and the display may be provided to be detachable from the center fascia 130 of the vehicle 100.

Here, the display 134 may be implemented by a liquid crystal display (LCD), a light emitting diode (LED), a plasma display panel (PDP), an organic light emitting diode (OLED), a cathode ray tube (CRT), etc., but is not limited thereto.

In addition, the dashboard 150 may further include various types of instrument panels capable of displaying a driving speed, engine revolutions per minute (RPM), fuel level, and/or the like of the vehicle 100, a glove box capable of accommodating various types of objects, etc.

The speaker 160 capable of outputting sound may be provided inside the vehicle 100. The speaker may output information on the vehicle 100 as sound. For example, when the vehicle 100 receives the output signal which outputs the recommended driving method, the speaker 160 may inform a passenger by outputting the recommended driving method corresponding to the output signal through sound.

Meanwhile, personal habits of a driver may appear through the vehicle 100 while driving. Here, when drivers inside adjacent vehicles 100a adjacent to a subject vehicle are aware of a driving pattern of a driver inside the subject vehicle, all of the drivers inside the adjacent vehicles 100a may prepare for the driving pattern of the driver inside the subject vehicle in advance and safely drive the adjacent vehicles 100a. Hereinafter, the vehicle 100 which transmits an output signal, which outputs a recommended driving method corresponding to a driving pattern of a driver, to the adjacent vehicles 100a will be described.

Figure 3A:
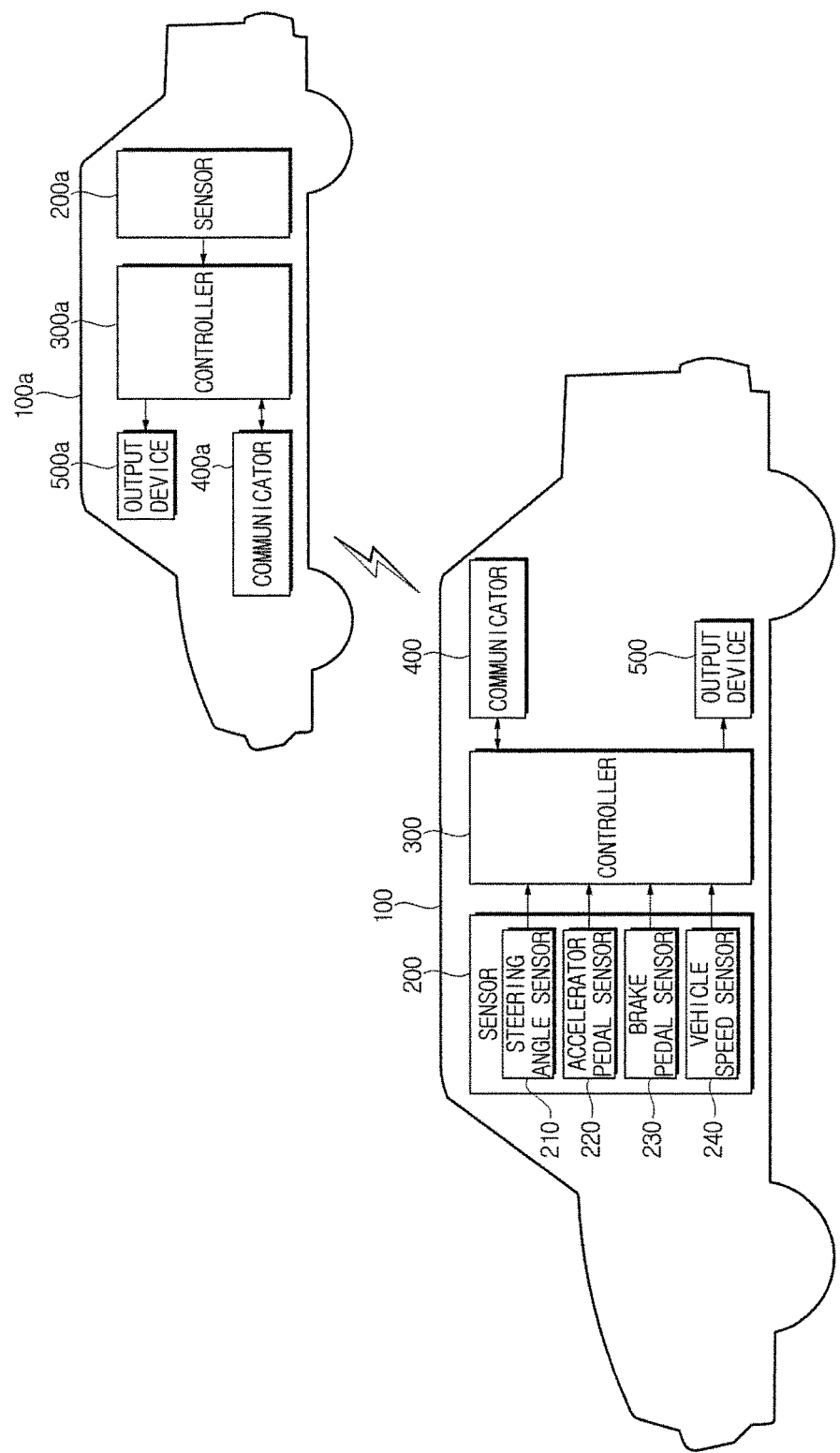
FIGS. 3A and 3B are control block diagrams of vehicles according to various embodiments.
Figure 3B:
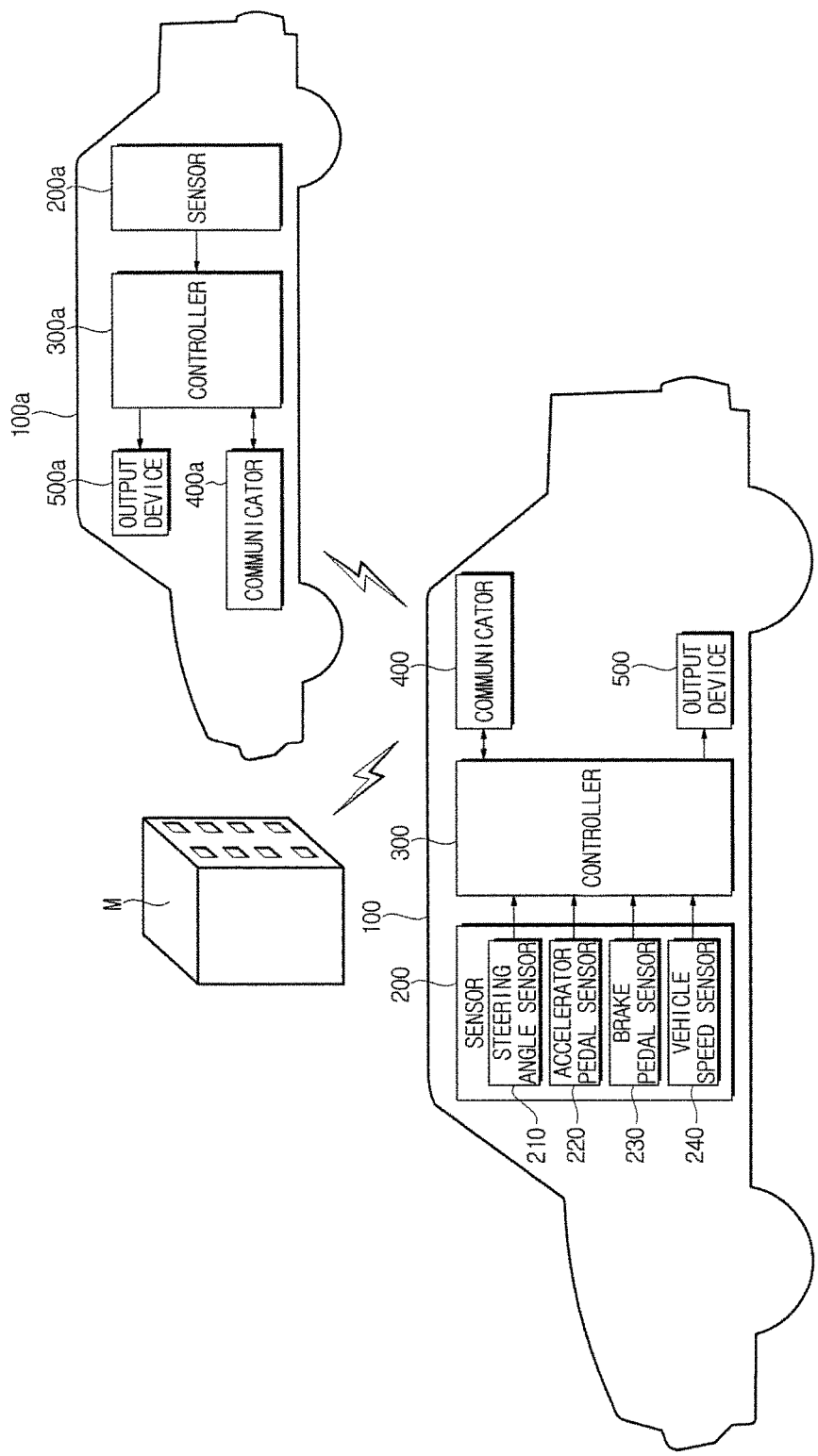

FIGS. 3A and 3B are control block diagrams of vehicles according to various embodiments. It is assumed that the configurations of the vehicle 100 and the adjacent vehicle 100a are the same in FIGS. 3A and 3B.

Referring to FIG. 3A, the vehicle 100 according to one embodiment of the present invention may include a sensor 200 which obtains driving information on a driver, a controller 300 which confirms a driving pattern of the driver based on the obtained driving information and generates an output signal which outputs a recommended driving method corresponding to the confirmed driving pattern, a communicator 400 which directly transmits the generated output signal to the adjacent vehicle 100a and directly receives the output signal, which outputs a recommended driving method, from the adjacent vehicle 100a, and an output device 500 which outputs information on the vehicle 100.

The output device 500 may output information on the vehicle 100 so that the driver may visually or acoustically recognize the output information. To this end, the output device 500 may include the display 134 which visually outputs information on the vehicle 100 and the speaker 160 which acoustically outputs information on the vehicle 100.

The display and the speaker are the same as those described with reference to FIG. 2, and thus the detailed descriptions thereof will be omitted.

Furthermore, the output device 500 may output information on the vehicle 100 so that the driver may tactually recognize the output information. To this end, the output device 500 may further include a vibration generator or wearable device which tactually outputs information on the vehicle 100.

The vibration generator and the wearable device may output information on the vehicle 100 in a vibration form. For example, when the vehicle 100 receives the output signal which outputs the recommended driving method, the vibration generator or the wearable device may inform a passenger by outputting the recommended driving method corresponding to the output signal through a vibration pattern.

To this end, the vibration generator may be provided at a position with which the passenger may be in direct contact. For example, the vibration generator is provided in the steering wheel 140 and may transfer vibration to the hand of the driver. On the other hand, the vibration generator may be provided in the seat 110 on which passengers including the driver sit. However, this is simply described for embodiments of positions at which the vibration generator is provided, but the position of the vibration generator is not limited to above described embodiments.

Further, the wearable device may be directly worn on the bodies of passengers including the driver. For example, when the wearable device is implemented as a smart watch, the smart watch may be worn on the hand of the driver. When the smart watch outputs a vibration pattern based on an output signal, the driver may recognize a recommended driving method corresponding to the vibration pattern.

A detailed method, by which the output device 500 outputs the recommended driving method based on the output signal received from the adjacent vehicle 100a and provides the recommended driving method to the driver, will be described below.

The sensor 200 may obtain driving information on the driving of the vehicle 100. Here, the driving information may mean all information on an operation of the vehicle 100 of the driver while driving.

The sensor 200 may include a steering angle sensor 210 which detects a steering angle, an accelerator pedal sensor 220 which detects a driver's pressure on an accelerator pedal, a brake pedal sensor 230 which detects a driver's pressure on a brake pedal, and a vehicle speed sensor 240 which detects a speed of the vehicle 100, to obtain the driving information. However, this is a simple embodiment of the sensor 200. The sensor 200 different from the above described sensor 200 may be applied to the vehicle 100, or only a part of the above described sensor 200 may be included in the vehicle 100.

The controller 300 may confirm a driving pattern of the driver based on the driving information obtained by the sensor 200.

Here, the driving pattern of the driver may mean a pattern formalized and classified operations repeatedly performed while the driver is driving. An embodiment of the driving pattern may include a high speed driving pattern, a low speed driving pattern, a rapid acceleration pattern, a rapid braking pattern, a rapid lane change pattern, a one-side (right side or left side) lane departure pattern, etc., but is not limited thereto. In the embodiment described with reference to FIG. 3A, the driving pattern may be stored in a memory of the controller 300 in advance as a database (DB).

In order to confirm the driving pattern of the driver, the controller 300 may analyze the obtained driving information. Specifically, the controller 300 receives and accumulates driving information from the sensor 200 for a preset period, and the accumulated driving information may be calculated by a statistical method.

Next, the controller 300 may determine whether the driving pattern of the driver corresponds to each of a plurality of driving patterns stored in advance based on the calculated result. Since each of the driving patterns has its own conditions corresponding to the driving pattern of the driver, the controller 300 may determine whether the previously obtained and calculated result satisfies conditions of each of the plurality of driving patterns and may determine a driving pattern for the driver.

For example, when the number of presses on a brake pedal with a predetermined amount of pressure or more by the driver in a preset period is the predetermined number or more, the controller 300 may decide that the driver has a rapid braking pattern.

In another example, when the number of rotations of a steering wheel to a predetermined brake angle or more by the driver in a preset period is the predetermined number or more, the controller 300 may decide that the driver has a one-side lane departure pattern.

Next, the controller 300 may generate an output signal which outputs a recommended driving method corresponding to the decided driving pattern. Here, the recommended driving method is not for the vehicle 100 from which the output signal is generated, and may be to guide driving of the adjacent vehicle 100*a* adjacent to the corresponding vehicle 100.

In particular, the controller 300 may generate an output signal which outputs a recommended driving method for the vehicle at a position in a direction corresponding to the driving pattern among the adjacent vehicles 100*a*. Accordingly, the controller 300 may generate the output signal for the adjacent vehicle 100*a* which needs to be driven in consideration of the corresponding driving pattern, and may not generate the output signal for the adjacent vehicles unrelated to the corresponding driving pattern.

For example, when the vehicle 100 is determined to have a rapid braking pattern, the controller 300 may generate an output signal which outputs a recommended driving method for a rear vehicle. In this case, an embodiment of the recommended driving method may include "secure a safe distance from a front vehicle" "decelerate driving," "change a distance setting value from the front vehicle to the front of an Advanced Smart Cruise Control (ASCC)," etc.

In another example, when the vehicle 100 is determined to have a right side lane departure pattern, the controller 300 may generate an output signal which outputs a recommended driving method for a right vehicle. In this case, an embodiment of the recommended driving method may include "secure a safe distance from a left vehicle," etc.

The communicator 400 may directly transmit the generated output signal to the adjacent vehicle 100*a*.

The communicator 400 may adopt various communication protocols to communicate with the adjacent vehicle 100*a*. For example, the communicator 400 may transceive a wireless signal with the adjacent vehicle 100*a* through a base station using a communication protocol such as the 3rd Generation (3G), the 4th Generation (4G), etc., and in addition, may transceive information with a server within a predetermined distance through a communication protocol such as a wireless local area network (LAN), a Wi-Fi protocol, a Bluetooth protocol, a ZigBee protocol, a Wi-Fi Direct (WFD) protocol, an ultra-wideband (UWB) protocol, an infrared data association (IrDA) protocol, a Bluetooth low energy (BLE) protocol, a near field communication (NFC) protocol, etc.

Further, the communicator 400 may transceive a wireless signal through the 5th Generation (5G) communication protocol. Hereinafter, the 5G communication protocol will be described with reference to FIGS. 4 to 5C in detail.

Figure 4:
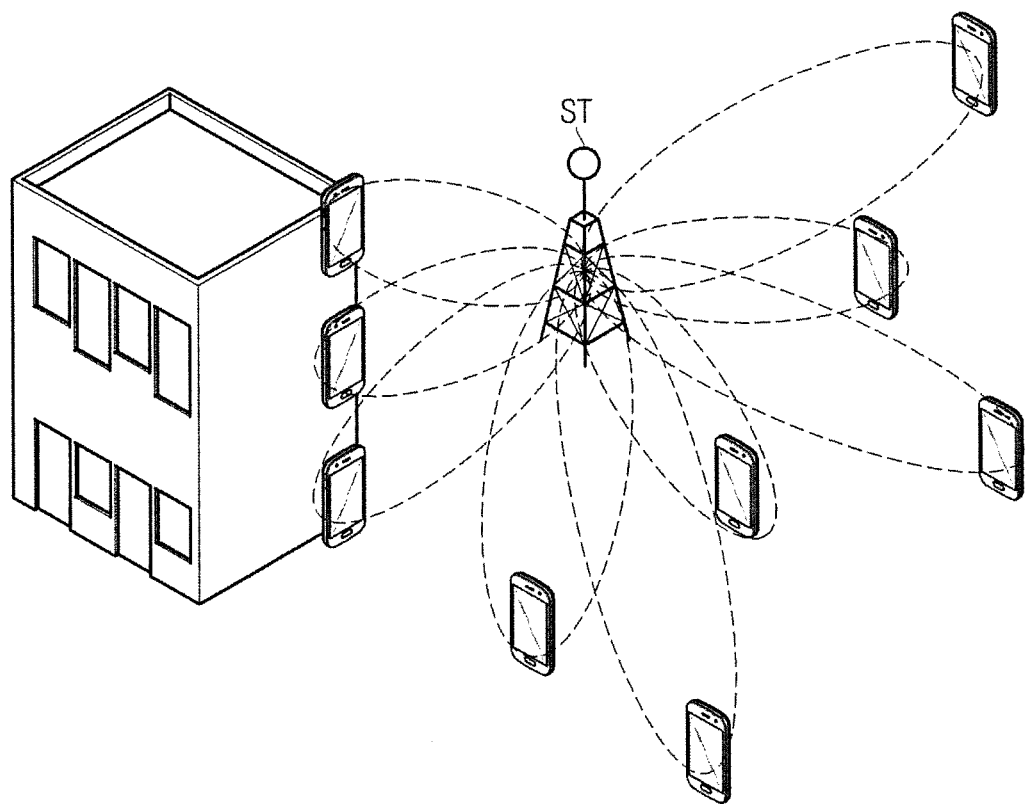
FIG. 4 is a view illustrating a macro-antenna system of a base station based on the 5G communication protocol according to one embodiment.
Figure 5A:
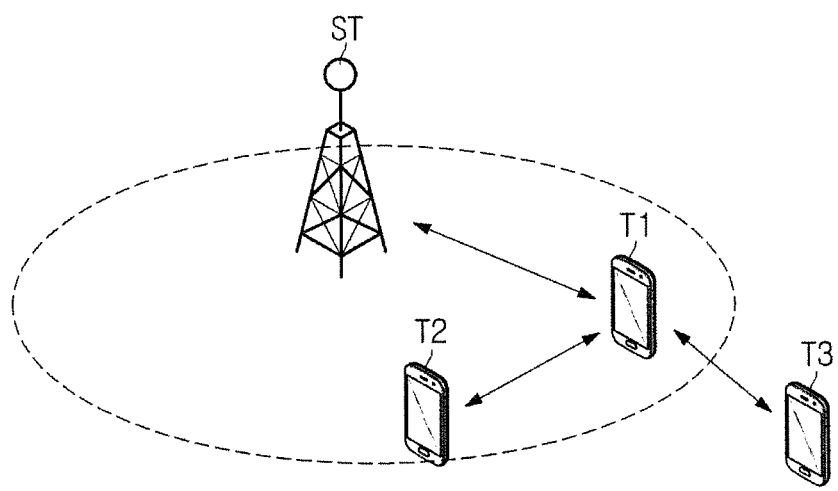
FIGS. 5A to 5C are views illustrating a network based on the 5G communication protocol according to one embodiment.
Figure 5B:
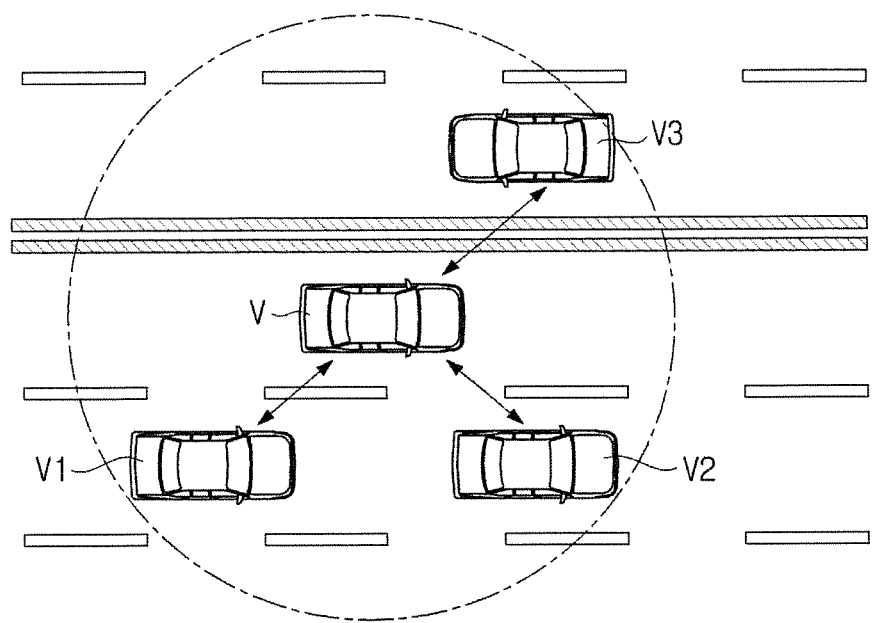
Figure 5C:
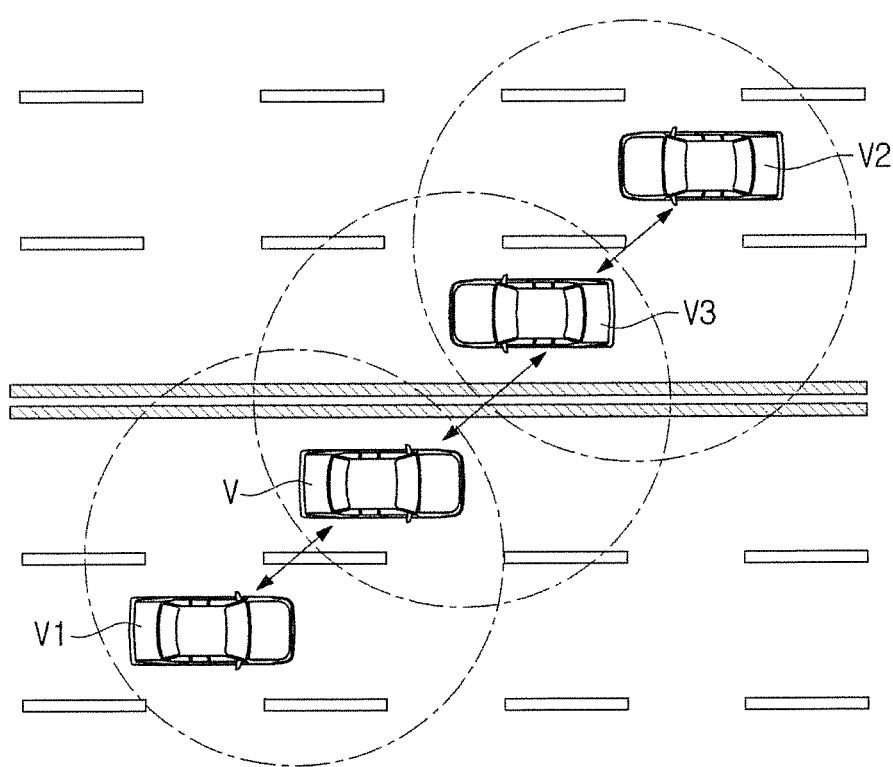

FIG. 4 is a view illustrating a macro-antenna system of a base station based on the 5G communication protocol according to one embodiment, and FIGS. 5A to 5C are views illustrating a network based on the 5G communication protocol according to one embodiment.

The 5G communication protocol uses a frequency bandwidth of 2 GHz or less, but the 5G communication protocol may use an ultra-high frequency bandwidth of approximately 28 GHz. However, the frequency bandwidth used in the 5G communication protocol is not limited thereto.

A macro-antenna system may be adopted for the 5G communication protocol. The macro-antenna system means a system capable of using dozens of antennas or more to cover an ultra-high frequency bandwidth, and simultaneously transceiving a large amount of information through multiple access. Specifically, since the macro-antenna system may adjust an arrangement of antenna devices and transceive a radio wave over a long distance in a specific direction, mass data transmission can be achieved and an accessible region of the 5G communication network can also be expanded.

Referring to FIG. 4, the base station may simultaneously transceive information with a number of devices through the macro-antenna system. Further, the macro-antenna system minimizes radio waves in directions excluding a direction of transmission of the radio wave, and thus noise thereof is reduced. Accordingly, the improvement of transmission quality and the reduction of an amount of power thereof can be achieved.

Further, the 5G communication protocol, unlike a conventional method which modulates a transmitting signal through an orthogonal frequency division multiplexing (OFDM) method, transmits a wireless signal modulated through a non-orthogonal multiplexing access (NOMA) method, and thereby both multiple access by more devices and mass data transceiving are possible at the same time.

Further, the 5G communication protocol may perform a real-time process of which a maximum response speed is 1 ms or less. Accordingly, the 5G communication protocol may support a real-time service which reacts before a user is aware of it. For example, a vehicle may receive sensor information from various types of devices while driving, and not only may a self-driving system be provided through the real-time process, but also various types of remote controls may be provided. Further, the vehicle processes sensor information on other vehicles, which exist in the vicinity of the vehicle, through the 5G communication protocol in real time, and thus a crash occurrence probability may be provided to a user in real time, and traffic information to be generated on a driving path may also be provided in real time.

Further, the vehicle may provide a big data service to passengers inside the vehicle through a super real-time process and mass data transmission provided by the 5G communication. For example, the vehicle may analyze various types of Web information, social network service (SNS) information, and/or the like and may provide customized information suitable for a status of the passengers inside the vehicle. In one embodiment, the vehicle collects information on restaurants and attractions, which exist in the vicinity of a driving path, through big data mining and provide the collected information to the passengers in real-time, thereby passengers may immediately check various types of information existing in the vicinity of a driving region.

Meanwhile, when cells included in the 5G communication network are further subdivided, the high density of the cells and mass data transmission of networks may be supported. Here, the cell means a region subdivided from a wide region into small regions to efficiently use frequencies in mobile communication. Here, a small base station is installed in each cell to support communication between terminals. For example, when the size of each cell included in the 5G communication network is reduced and further subdivided, a two stage structure having "macro-cell base station-to-distributed small base station-to-communication terminal" may be formed.

Further, in the 5G communication network, relay-transmission of wireless signals through a multihop method may be performed. For example, as shown in FIG. 5A, a first terminal T1 may relay-transmit wireless signals to be transmitted by a third terminal T3 positioned outside the network of a base station ST to the base station ST. Further, the first terminal T1 may relay-transmit wireless signals to be transmitted by a second terminal T2 positioned inside the network of the base station ST to the base station ST. As described above, at least one of devices capable of accessing the 5G communication network may perform relay-transmission through the multihop method, but it is not limited thereto. Accordingly, it is possible to expand a region supported by the 5G communication network and to simultaneously solve a buffering problem generated when a large number of users exist in a cell.

Meanwhile, the 5G communication protocol may support device-to-device (D2D) communication applied to vehicles, wearable devices, etc. As the D2D communication is performed between devices, the D2D communication means communication for transceiving wireless signals having various types of data stored in the devices in addition to data detected by the devices through a sensor. According to the D2D communication protocol, wireless signals do not need to be transmitted and received through a base station and the wireless signals are transmitted between devices, thereby reducing unnecessary energy. Here, an antenna has to be built-in to each corresponding device to use the 5G communication protocol in vehicles, wearable devices, etc.

A vehicle may transceive wireless signals with other vehicles, which exist in the vicinity of the vehicle, through the D2D communication. For example, as shown in FIG. 5B, a vehicle V may perform the D2D communication with other vehicles V1, V2, and V3 which exist in the vicinity of the vehicle V. In addition, the vehicle V may perform the D2D communication with traffic information devices (not shown) installed at intersections, etc.

In another example, as shown in FIG. 5C, the vehicle V may transceive wireless signals with the first vehicle V1 and the third vehicle V3 through the D2D communication, and the third vehicle V3 may transceive data with the vehicle V and the second vehicle V2 through the D2D communication. That is, a virtual network is formed between the plurality of vehicles V, V1, V2, and V3 positioned within a distance in which the D2D communication is possible, and wireless signals may be transceived.

When the communicator 400 adopts the above described 5G communication protocol, the vehicle 100 may transceive a large amount of information with the adjacent vehicle 100a at a high speed. To this end, the communicator 400 may include a phase array antenna, and a beam pattern may be formed through the phase array antenna.

Here, the beam pattern may mean a pattern represented by the intensity of the wireless signals when the wireless signals are concentrated in a specific direction. Further, the phase array antenna is an antenna capable of controlling a beam pattern of all array antennas by regularly arranging unit antenna devices and controlling a phase difference of the wireless signal output from each unit antenna device.

Here, when a beam pattern of radio waves to be output from an array antenna has a major direction θ, a phase difference Δϕ of a wireless signal output from each unit antenna device may be calculated by the following Equation 1.

$$\Delta\phi = -\frac{2\pi d}{\lambda}\cos\theta. \quad \text{[Equation 1]}$$

(Δϕ denotes a phase difference, d denotes an interval between unit antennas, λ denotes a wavelength of a carrier wave, and θ denotes a major direction of a beam pattern.)

In the Equation 1, a major direction θ of a beam pattern is determined by a phase difference Δϕ between unit antennas and an interval between the unit antennas.

Further, a 3 dB beam width BW of one beam pattern to be output from an array antenna may be calculated by the following Equation 2.

$$BW \simeq \sin^{-1}\left(\frac{2\times 1.391\lambda}{\pi dN}\right). \quad \text{[Equation 2]}$$

(BW denotes a beam width of a beam pattern, d denotes an interval between unit antennas, λ denotes a wavelength of a carrier wave, and N denotes the number of array antennas.)

In the Equation 2, a beam width of a beam pattern is determined by an interval between unit antennas and the number of unit antennas.

The communicator 400 may determine a direction of the beam pattern by controlling phase differences between unit antennas of the phase array antenna. As a result, the communicator 400 may transmit an output signal to a vehicle corresponding to the output signal generated by the controller 300.

The communicator 400 included in the adjacent vehicle 100a may receive the output signal from the vehicle 100. The controller 300 of the adjacent vehicle 100a may control the output device 500 to output a recommended driving method in response to the received output signal. The output device 500 may visually, acoustically, and tactually output the recommended driving method and the recommended driving method may be provided to a driver inside the adjacent vehicle 100a. As a result, the driver inside the adjacent vehicle 100a may drive the adjacent vehicle 100a according to the recommended driving method corresponding to the driving pattern of the driver inside the vehicle 100, and thus the risk of accidents may be reduced.

Hereinbefore, the case in which the controller 300 of the vehicle 100 determines the driving pattern by itself is described. Hereinafter, a case in which a driving pattern of a driver is confirmed through communication between the vehicle 100 and the server M will be described with reference to FIG. 3B.

The vehicle according to the embodiment described with reference to FIG. 3B has the same configuration as the vehicle according to the embodiment described with reference to FIG. 3A. Accordingly, operations will be described based on the controller 300 and the communicator 400.

Referring to FIG. 3B, the controller 300 may transmit driving information transferred from the sensor 200 to the server M through the communicator 400.

The server M may confirm a driving pattern of a driver based on driving information received from the vehicle 100. In order to confirm the driving pattern of the driver, the server M may analyze the obtained driving information.

Specifically, the controller 300 may receive and accumulate the driving information from the sensor 200 for a preset period and calculate the accumulated driving information by a statistical method. Next, the controller 300 may determine whether a driving pattern of the driver corresponds to each of a plurality of driving patterns stored in advance based on the calculated result.

Unlike the embodiment described with reference to FIG. 3A, a DB of the driving patterns may be stored in the server M in advance. Accordingly, the server M may determine the driving pattern of the driver based on the DB stored in advance.

The communicator 400 may receive the driving pattern from the server M, and transfer the driving pattern to the controller 300. As a result, the controller 300 may confirm the driving pattern of the driver through the server M.

Hereinbefore, the case in which the vehicle 100 generates one output signal and transmits the output signal to one adjacent vehicle is described. However, the vehicle 100 may transmit different output signals to a plurality of adjacent vehicles.

Figure 6:
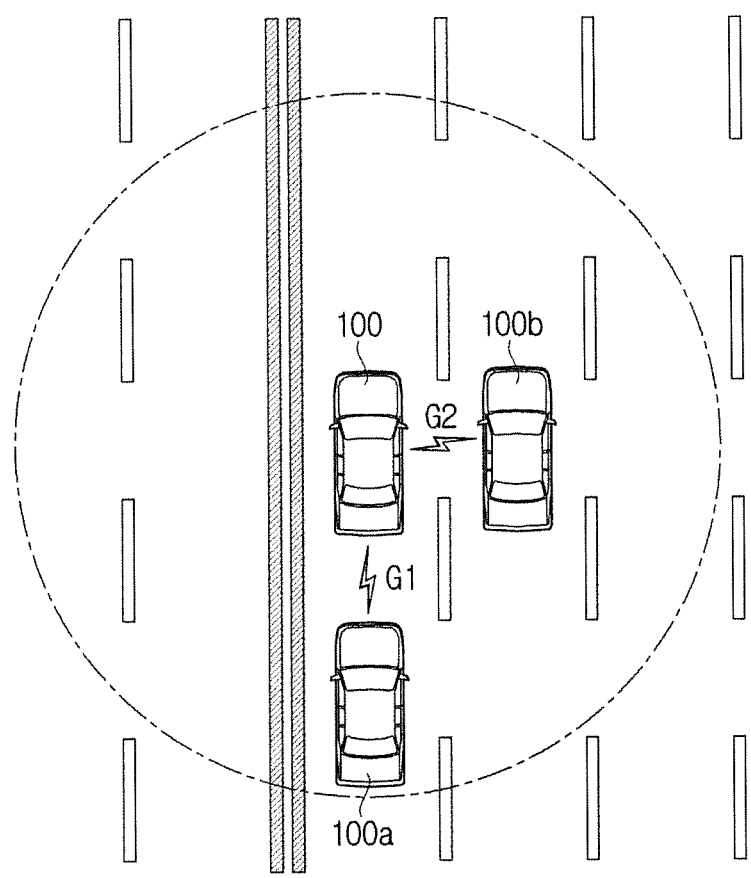
FIG. 6 is a view for describing a method of transmitting an output signal of a vehicle according to another embodiment.

FIG. 6 is a view for describing a method of transmitting an output signal of a vehicle according to another embodiment.

Unlike the embodiments described with reference to FIGS. 3 to 5C, a driver may have a plurality of driving patterns. For example, the number of presses on a brake pedal with a predetermined amount of pressure or more by the driver in a preset period is the predetermined number or more, and the number of rotations of a steering wheel to a predetermined brake angle or more by the driver for a preset period is the predetermined number or more at the same time. In this case, the controller 300 may decide that the driver has a rapid braking pattern and a one-side lane departure pattern at the same time.

As a result, the controller 300 may generate a plurality of output signals which control to output each of a plurality of driving methods of interest corresponding to the plurality of driving patterns. According to the above described example, the controller 300 may generate an output signal G1 for a rear vehicle 100a and simultaneously generate an output signal G2 for a right vehicle 100b.

Next, the communicator 400 may transmit each of the plurality of output signals to a corresponding adjacent vehicle. According to the above described example, the communicator 400 may transmit the output signal G1 which outputs a recommended driving method for the rear vehicle 100a to the rear vehicle 100a, and transmit the output signal G2 which outputs a recommended driving method for the right vehicle 100b to the right vehicle 100b.

Like this, since the vehicle 100 transmits an output signal corresponding to a position of each of the plurality of adjacent vehicles, a recommended driving method optimized for a driving environment of each of the plurality of adjacent vehicles may be provided. As a result, the driver may drive the vehicle in a safer environment.

Figure 7:
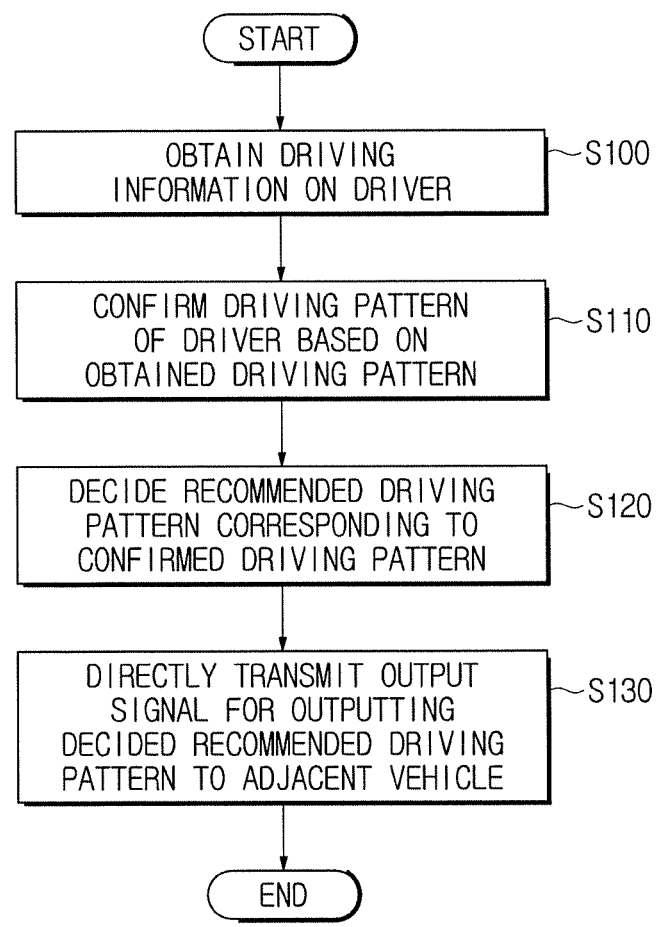
FIG. 7 is a flowchart of a vehicle control method according to one embodiment.

FIG. 7 is a flowchart of a vehicle control method according to one embodiment.

First, the vehicle 100 may obtain driving information on a driver using a sensor (S100). Here, the driving information may mean all information on the operation of the vehicle 100 of the driver while driving.

To this end, the sensor 200 may include a steering angle sensor 210 which detects a steering angle, an accelerator pedal sensor 220 which detects a driver's pressure on an accelerator pedal, a brake pedal sensor 230 which detects driver's pressure on a brake pedal, and a vehicle speed sensor 240 which detects a speed of the vehicle 100.

After the driving information is obtained, the controller 300 of the vehicle 100 may confirm a driving pattern of the driver (S110). Here, the driving pattern of the driver may mean a pattern formalized and classified operations repeatedly performed while the driver is driving. An embodiment of the driving pattern may include a high-speed driving pattern, a low-speed driving pattern, a rapid acceleration pattern, a rapid braking pattern, a one-side (right side or left side) lane departure pattern, etc.

To this end, the controller 300 of the vehicle 100 may analyze the driving information. Specifically, the controller 300 receives and accumulates driving information from the sensor 200 for a preset period, and the accumulated driving information may be calculated by a statistical method.

Next, the controller 300 may determine whether the driving pattern of the driver corresponds to each of a plurality of driving patterns stored in advance based on the calculated result. Since each of the driving patterns has its own conditions corresponding to the driving pattern of the driver, the controller 300 may determine whether the previously obtained and calculated result satisfies conditions of each of the plurality of driving patterns and may determine the driving pattern of the driver.

After the driving pattern is determined, the controller 300 of the vehicle 100 may determine a recommended driving method corresponding to the driving pattern (S120). Here, the recommended driving method is not for the vehicle 100 for which the recommended driving method is determined, and may be to guide driving of the adjacent vehicle adjacent to the corresponding vehicle 100.

In particular, the controller 300 may determine a recommended driving method for the vehicle positioned in a direction corresponding to the corresponding driving pattern among adjacent vehicles. Accordingly, the controller 300 may determine a recommended driving method for an adjacent vehicle which needs to be driven in consideration of the corresponding driving pattern, and may not generate a recommended driving method for adjacent vehicles unrelated to the corresponding driving pattern.

Finally, the communicator 400 of the vehicle 100 may directly transmit an output signal which outputs the decided recommended driving method to an adjacent vehicle. The adjacent vehicle receiving the output signal may output a recommended driving method based on the output signal and provide the recommended driving method to a driver inside the adjacent vehicle.

Hereinafter, various embodiments of a method of determining a driving pattern will be described with reference to FIGS. 8 and 9 in detail.

Figure 8:
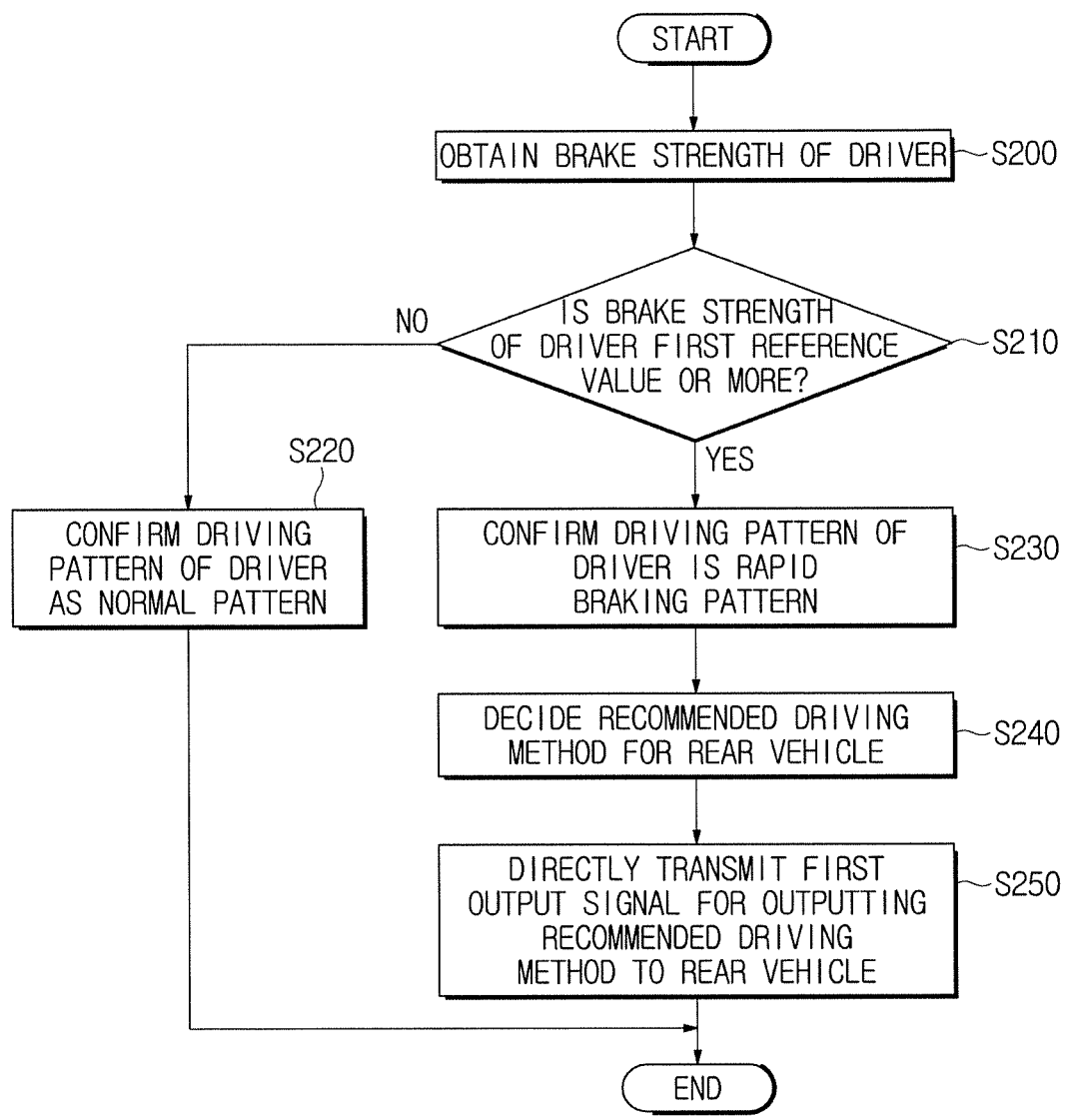
FIG. 8 is a flowchart of a vehicle control method according to another embodiment.

FIG. 8 is a flowchart of a vehicle control method according to another embodiment.

First, the vehicle 100 may obtain a braking strength of a driver (S200). To this end, the vehicle 100 may use the brake pedal sensor 230.

Specifically, the brake pedal sensor 230 may detect the braking strength based on pressure applied by the driver to the brake pedal.

After the braking strength is obtained, the controller 300 of the vehicle 100 determines whether the braking strength of the driver is a first reference value or more (S210). Here, the first reference value may mean a minimum value of the braking strength by which a driving pattern of the driver is determined to be a rapid braking pattern.

When the braking strength of the driver is less than the first reference value, the controller 300 of the vehicle 100 confirms that the driver has a normal driving pattern and a process is complete (S220), On the other hand, when the braking strength of the driver is the first reference value or more, the controller 300 of the vehicle 100 confirms that the driving pattern of the driver is the rapid braking pattern (S230).

Next, the controller 300 of the vehicle 100 may determine a recommended driving method corresponding to the rapid braking pattern (S240). Specifically, the controller 300 of the vehicle 100 may determine a recommended driving method for a rear vehicle. Here, the recommended driving method for the rear vehicle may include at least one of "secure a safe distance from a front vehicle," "decelerate driving," and "change a distance setting value from the front vehicle of an ASCC."

Finally, the controller 300 of the vehicle 100 may directly transmit a first output signal which outputs a recommended driving method for a rear vehicle (S250). The rear vehicle receiving the first output signal may visually, acoustically, and tactually output the recommended driving method including at least one of "secure a safe distance from a front vehicle," "decelerate driving," and "change a distance setting value of from the front vehicle of the ASCC," and thus the recommended driving method may be provided to a driver inside the rear vehicle.

Figure 9:
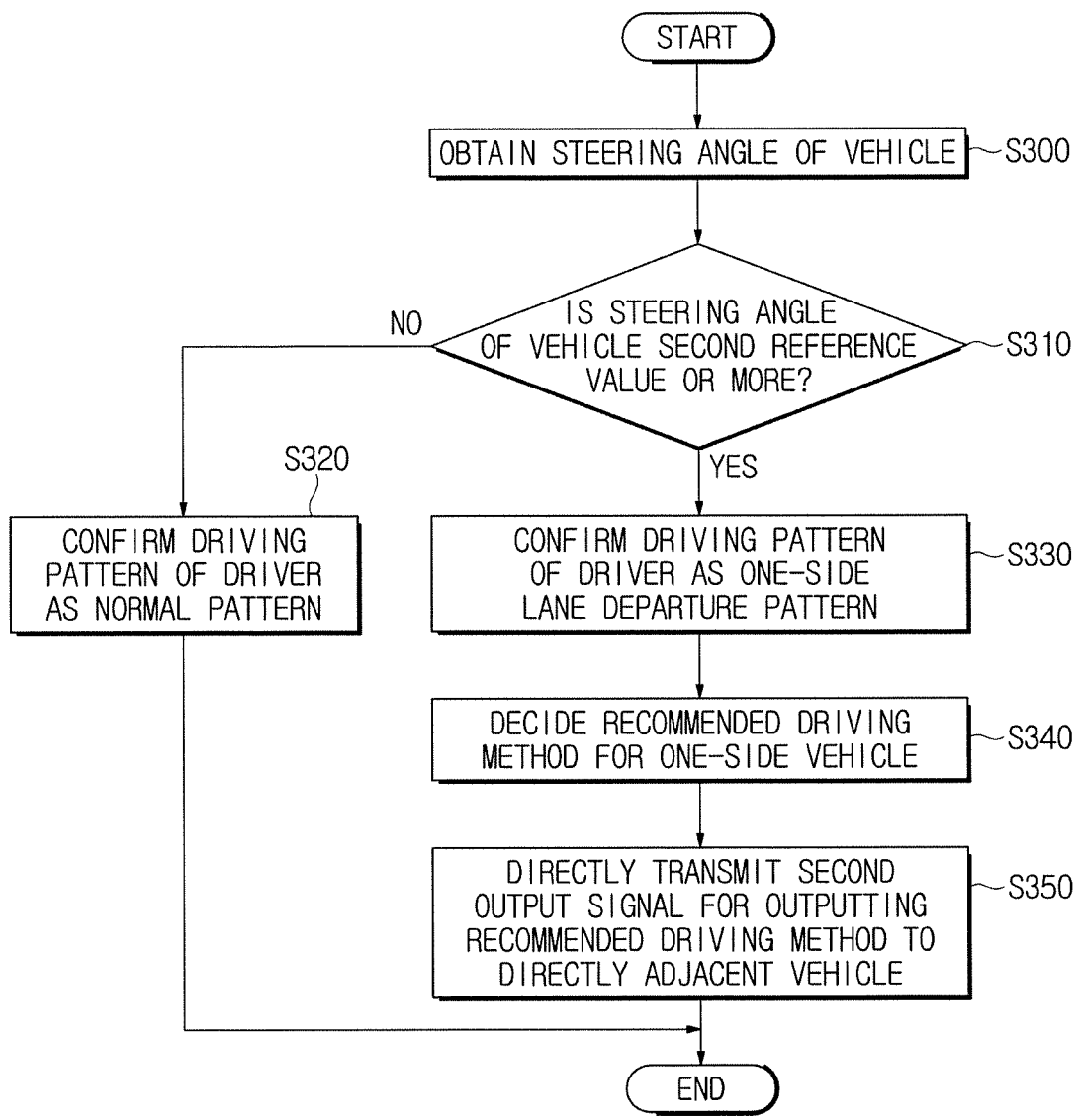
FIG. 9 is a flowchart of a vehicle control method according to still another embodiment.

FIG. 9 is a flowchart of a vehicle control method according to still another embodiment.

First, the vehicle 100 may obtain a steering angle of a vehicle (S300). To this end, the vehicle 100 may use the steering angle sensor 210.

Specifically, the steering angle sensor 210 may detect the steering angle through the steering wheel rotated by the driver.

After the steering angle is obtained, the controller 300 of the vehicle 100 may determine whether the steering angle of the vehicle is a second reference value or more (S310). Here, the second reference value may mean a minimum value of the steering angle by which the driving pattern of the driver is determined to be a one-side (right side or left side) lane departure pattern.

When the steering angle of the vehicle is less than the second reference value, the controller 300 of the vehicle 100 confirms that the driver has a normal driving pattern and the process is complete (S320).

On the other hand, when the steering angle of the vehicle is the second reference value or more, the controller 300 of the vehicle 100 confirms that the driving pattern of the driver is the one-side lane departure pattern (S330).

Next, the controller 300 of the vehicle 100 may determine a recommended driving method corresponding to the one-side lane departure pattern (S340). Specifically, the controller 300 of the vehicle 100 may determine a recommended driving method for a one-side vehicle. Here, the recommended driving method may include "secure a safe distance from the other side vehicle."

Finally, the controller 300 of the vehicle 100 may directly transmit a second output signal which outputs the recommended driving method to the adjacent vehicle (S350). The adjacent vehicle receiving the second output signal may visually, acoustically, and tactually output the recommended driving method including "secure a safe distance from the other side vehicle," and thus the recommended driving method may be provided to a driver inside the adjacent vehicle.

Figure 10:
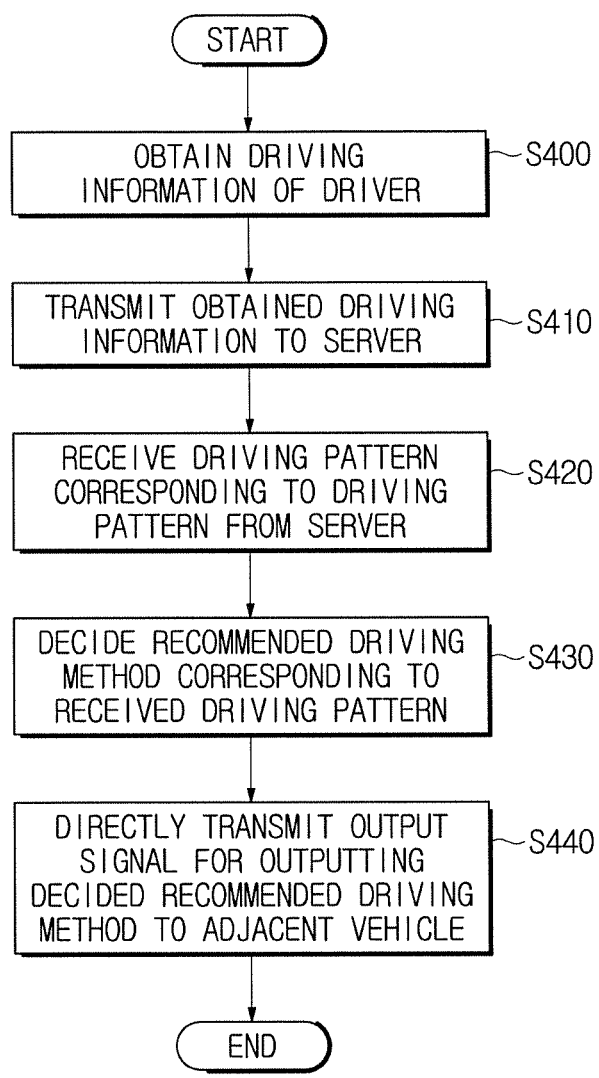
FIG. 10 is a flowchart of a vehicle control method according to yet another embodiment.

FIG. 10 is a flowchart of a vehicle control method according to yet another embodiment.

First, the vehicle 100 may obtain driving information on a driver using a sensor (S400). Here, the driving information may mean all information on the operation of the vehicle 100 of the driver while driving.

After the driving information is obtained, the communicator 400 of the vehicle 100 may transmit the driving information of the driver to the server M (S410). Driving patterns corresponding to the driving information are stored in the server M as a DB, and thus the server M may determine a driving pattern of the driver with reference to the DB.

Next, the communicator 400 of the vehicle 100 may receive the driving pattern corresponding to the driving information from the server M (S420).

After the driving pattern is received, the controller 300 of the vehicle 100 may determine a recommended driving method corresponding to the driving pattern (S430). In particular, the controller 300 may determine a recommended driving method for the vehicle positioned in a direction corresponding to the corresponding driving pattern among adjacent vehicles.

Finally, the communicator 400 of the vehicle 100 may directly transmit an output signal which outputs the determined recommended driving method to an adjacent vehicle (S440). The adjacent vehicle receiving the output signal may output a recommended driving method in response to the output signal and provide the recommended driving method to a driver inside the adjacent vehicle.

As is apparent from the above description, according to the embodiments of the present invention, the vehicle and the method of controlling the same provide an output signal, which outputs a recommended driving method corresponding to a driving pattern of a driver inside a subject vehicle, to adjacent vehicles, and thus the risk of accidents with adjacent vehicles can be reduced.

Although various embodiments of the present invention have been shown and described, it would be appreciated by those skilled in the art that changes may be made in these embodiments without departing from the principles and spirit of the inventive concept, the scope of which is defined in the claims and their equivalents.

What is claimed is:

1. A vehicle comprising:
    a sensor configured to obtain driving information of a driver;
    a controller configured to confirm a driving pattern of the driver based on the obtained driving information, and generate an output signal which outputs a recommended driving method corresponding to the confirmed driving pattern; and
    a communicator configured to directly transmit the generated output signal to adjacent vehicles,
    wherein the communicator including a phase array antenna is configured to generate a beam pattern, in which the output signal is concentrated in a direction corresponding to the driving pattern, by using the phase array antenna, and configured to transmit the generated beam pattern to the adjacent vehicles located in the direction corresponding to the driving pattern.

2. The vehicle of claim 1, wherein the sensor obtains the driving information including at least one of an intensity of acceleration of the driver, a braking strength, a steering angle, and a speed of the vehicle.

3. The vehicle of claim 1, wherein the controller generates the output signal which outputs the recommended driving method for the adjacent vehicle positioned corresponding to the driving pattern.

4. The vehicle of claim 3, wherein the communicator directly transmits the output signal to the adjacent vehicle positioned corresponding to the driving pattern.

5. The vehicle of claim 1, wherein the controller determines the driving pattern based on a correspondence to a preset condition when the obtained driving information satisfies the preset condition.

6. The vehicle of claim 1, wherein:
the communicator communicates with a server; and
the controller transmits the obtained driving information to the server through the communicator, and receives the driving pattern of the driver from the server through the communicator.

7. The vehicle of claim 1, wherein:
the controller generates a first output signal which outputs the recommended driving method for a rear vehicle among the adjacent vehicles when the driving pattern of the driver is confirmed as a rapid braking pattern; and
the communicator directly transmits the first output signal to the rear vehicle.

8. The vehicle of claim 7, wherein the controller generates the first output signal which outputs the recommended driving method including at least one of a securement of a safe distance from a front vehicle, a deceleration of driving, and a change in a distance setting value from the front vehicle having an Advanced Smart Cruise Control (ASCC).

9. The vehicle of claim 1, wherein:
the controller generates a second output signal which outputs the recommended driving method for a directly adjacent vehicle among the adjacent vehicles when the driving pattern of the driver is confirmed as a one-side lane departure pattern; and
the communicator directly transmits the second output signal to the directly adjacent vehicle.

10. The vehicle of claim 9, wherein the controller generates the second output signal which outputs the recommended driving method including a securement of a safe distance from the vehicle.

11. The vehicle of claim 1, further comprising an output device configured to output the recommended driving method in response to the received output signal when the communicator receives the output signal from the adjacent vehicle.

12. A method of controlling a vehicle, comprising steps of:
obtaining driving information on a driver;
confirming a driving pattern of the driver based on the obtained driving information;
generating an output signal which outputs a recommended driving method corresponding to the confirmed driving pattern; and
directly transmitting the generated output signal to adjacent vehicles,
wherein the directly transmitting of the generated output signal to the adjacent vehicles includes:

generating a beam pattern, in which the output signal is concentrated in a direction corresponding to the driving pattern, by using a phase array antenna; and
transmitting the generated beam pattern to the adjacent vehicles located in the direction corresponding to the driving pattern.

13. The method of claim 12, wherein the step of obtaining the driving information of the driver includes obtaining information including at least one of an intensity of acceleration of the driver, a braking strength, a steering angle, and a speed of the vehicle.

14. The method of claim 12, wherein the step of generating the output signal includes generating the output signal which outputs the recommended driving method for the adjacent vehicle positioned corresponding to the driving pattern.

15. The method of claim 14, wherein the step of directly transmitting the output signal to the adjacent vehicles includes directly transmitting the output signal to the adjacent vehicle positioned corresponding to the driving pattern.

16. The method of claim 12, wherein the step of confirming the driving pattern of the driver based on the obtained driving information includes:
determining whether the obtained driving information satisfies a preset condition; and
determining the driving pattern based on a correspondence to the satisfied preset condition.

17. The method of claim 12, wherein the step of confirming the driving pattern of the driver based on the obtained driving information includes steps of:
transmitting the obtained driving information to a server; and
receiving the driving pattern of the driver from the server.

18. The method of claim 12, wherein:
the step of generating the output signal includes a step of generating a first output signal which outputs the recommended driving method for a rear vehicle among the adjacent vehicles when the driving pattern of the driver is confirmed as a rapid braking pattern; and
the step of directly transmitting the generated output signal to the adjacent vehicles directly transmits the first output signal to the rear vehicle.

19. The method of claim 18, wherein the step of generating the first output signal includes generating the first output signal which outputs the recommended driving method including at least one of a securement of a safe distance from a front vehicle, a deceleration of driving, and a change in a distance setting value from the front vehicle of an Advanced Smart Cruise Control (ASCC).

20. The method of claim 12, wherein:
the step of generating the output signal includes a step of generating a second output signal which outputs the recommended driving method for a directly adjacent vehicle among the adjacent vehicles when the driving pattern of the driver is confirmed as a one-side lane departure pattern; and
the step of directly transmitting the output signal to the adjacent vehicles includes directly transmitting the second output signal to the directly adjacent vehicle.

21. The method of claim 20, wherein the step of generating the second output signal includes generating the second output signal which outputs the recommended driving method including a securement of a safe distance from the vehicle.

22. The method of claim 12, further comprising:
receiving the output signal from the adjacent vehicle; and outputting the recommended driving method in response to the received output signal.

\* \* \* \* \*